(12) United States Patent
Ng et al.

(10) Patent No.: US 11,976,736 B2
(45) Date of Patent: May 7, 2024

(54) ECCENTRIC BACKFLOW PREVENTER

(71) Applicant: Acorn Engineering Company, Inc., City of Industry, CA (US)

(72) Inventors: Pui Yuen Ng, Eastvale, CA (US); Luis Fernando Prieto, Chino, CA (US); Adrian Alexander Filip, Corona, CA (US); Alan Long Thien Du, Covina, CA (US); Edward Barry Knoles, Duarte, CA (US)

(73) Assignee: Acorn Engineering Company, Inc., City of Industry, CA (US)

( * ) Notice: Subject to any disclaimer, the term of this patent is extended or adjusted under 35 U.S.C. 154(b) by 0 days.

(21) Appl. No.: 17/869,355

(22) Filed: Jul. 20, 2022

(65) Prior Publication Data

US 2023/0025349 A1    Jan. 26, 2023

Related U.S. Application Data

(60) Provisional application No. 63/223,789, filed on Jul. 20, 2021.

(51) Int. Cl.
*F16K 15/03* (2006.01)
*F16K 27/02* (2006.01)

(52) U.S. Cl.
CPC .......... *F16K 15/03* (2013.01); *F16K 27/0209* (2013.01); *F16K 15/035* (2013.01); *Y10T 137/7838* (2015.04); *Y10T 137/7898* (2015.04); *Y10T 137/7903* (2015.04)

(58) Field of Classification Search
CPC ...... F16K 15/03; F16K 15/034; F16K 15/035; F16L 21/002; Y10T 137/7838; Y10T 137/7898; Y10T 137/7903; Y10T 137/88054
See application file for complete search history.

(56) References Cited

U.S. PATENT DOCUMENTS

| | | | |
|---|---|---|---|
| 3,173,439 A | 3/1965 | Griswold et al. | |
| 4,249,568 A * | 2/1981 | Duggan | F16K 15/03 137/107 |
| 4,321,942 A | 3/1982 | Duggan | |
| 5,711,341 A * | 1/1998 | Funderburk | F16K 27/0227 137/527.2 |
| 5,794,655 A * | 8/1998 | Funderburk | F16K 15/033 137/527.2 |
| 5,947,152 A | 9/1999 | Martin et al. | |
| 6,343,618 B1 * | 2/2002 | Britt | F16K 15/035 137/527 |

(Continued)

*Primary Examiner* — Robert K Arundale
(74) *Attorney, Agent, or Firm* — The Webb Law Firm

(57) ABSTRACT

A backflow prevention device includes a main pipe body extending along a first center longitudinal axis, at least one check valve disposed within the main pipe body, an inlet pipe connected to an inlet side of the main pipe body, and an outlet pipe connected to an outlet side of the main pipe body. The inlet pipe and the outlet pipe extend along a second center longitudinal axis. The first center longitudinal axis is offset with respect to the second center longitudinal axis in a direction perpendicular to the first and second center longitudinal axes. A center of the valve seat of the at least one check valve is offset with respect to the second center longitudinal axis in the direction perpendicular to the first and second longitudinal axes.

23 Claims, 7 Drawing Sheets

(56) References Cited

U.S. PATENT DOCUMENTS

2005/0134045 A1\* 6/2005 Mohan ................. F16L 21/002
  285/370
2019/0249778 A1\* 8/2019 Huo ..................... F16K 1/2028

\* cited by examiner

ECCENTRIC BACKFLOW PREVENTER

CROSS-REFERENCE TO RELATED APPLICATIONS

This application claims priority to U.S. Provisional Patent Application No. 63/223,789, filed on Jul. 20, 2021, the disclosure of which is hereby incorporated by reference in its entirety.

BACKGROUND OF THE INVENTION

Field of the Invention

The present disclosure relates, in general, to a backflow prevention device and, more particularly, to a backflow prevention device having an inlet pipe and an outlet pipe that are offset with respect to the main pipe body and the check valve(s).

Description of Related Art

Backflow preventer valve devices are widely used in piping systems to prevent backflow under various conditions, such as low flow or back pressure. In backflow situations, contamination of upstream fluid by the downstream fluid can occur.

FIGS. 1 and 2 illustrate a backflow preventer 10 according to a prior art example. In particular, FIGS. 1 and 2 illustrate a backflow preventer of the type disclosed in U.S. Pat. No. 3,173,439 to Griswold et al., which is hereby incorporated by reference in its entirety. The backflow preventer 10 includes one or more valve bodies 11 that define an inlet side 12 and an outlet side 13 in communication with upstream and downstream piping, respectively. According to the example of FIGS. 1 and 2, the valve bodies 11 have an enlarged diameter with an inlet pipe 15 extending from one of the valve bodies 11 to the inlet side 12 and an outlet pipe 16 extending from the other of the valve bodies 11 to the outlet side 13. The valve bodies 11, the inlet pipe 15, and the outlet pipe 16 define a flow passage 14 that extends along a longitudinal axis L through the backflow preventer 10 from the inlet side 12 to the outlet side 13. In the example of FIGS. 1 and 2, the backflow preventer 10 includes two valve bodies 11 of the same shape structure arranged consecutively, with each valve body 11 housing a check valve 17 that includes a valve seat 18 fixedly disposed in a respective valve body 11, which defines a valve opening 19 through the valve seat 18, and a valve member 20 that is movably connected to valve seat 18. According to other prior art examples, the two check valves 17 may be disposed within a single valve body 11.

The valve member 20 is movable with respect to the valve seat 18 between an open position (shown in FIG. 2) in which the valve member 20 is disengaged from the valve seat 18 to allow fluid to flow through the valve opening 19 and a closed position in which valve member 20 engages the valve seat 18 to prevent fluid from flowing through the valve opening 19. In the example of FIGS. 1 and 2, the check valve 17 is a clapper-type check valve and the valve member 20 is a clapper member that is hingedly connected to the valve seat 18 and/or the valve body 11 by a hinge 21 disposed on the valve seat 18 and/or the valve body 11 and an arm 22 that extends from the hinge 21 to the downstream side of the valve member 20. The valve member 20 carries a gasket 23 or sealing member for sealingly engaging the valve seat 18 when the valve member 20 is in the closed position. According to another prior art example, the check valve 17 may be a poppet-type valve in which the valve member 20 moves linearly with respect to the valve seat 18.

During normal operations, fluid flows through the flow passage 14 of the backflow preventer 10 in a downstream direction from the inlet side 12 to the outlet side 13. The pressure of the fluid flow is sufficient to maintain the valve members 20 of the check valves 17 in an open position with respect to the valve seats 18. During a loss of flow pressure or during backflow situations where fluid begins to flow through the flow passage 14 in an upstream direction from the outlet side 13 to the inlet side 12, the valve members 20 of the check valves 17 will move to closed positions with respect to the valve seats 18 to close the valve openings 19 and prevent the upstream flow through the backflow preventer 10. The check valves 17 may incorporate a biasing mechanism, such as a spring mechanism disposed in the hinge 21, for biasing the valve member 20 to the closed position.

The valve bodies 11 each additionally include a raised portion 24 that is configured to provide an access opening to the interior of the valve body 11 and to accommodate the valve member 20, as well as any additional mechanisms associated with the valve member 20 and the hinge 21 for controlling the motion of the valve member 20. The raised portion 24 additionally provides clearance for the valve member 20 within the top of the valve body 11 away from the longitudinal axis L when the valve member 20 is open. Valve bodies of this type are frequently formed by casting of the entire valve body 11 or by casting or extrusion and subsequent joining or welding of portions of the valve body 11, which can be time consuming and expensive.

As shown in FIGS. 1 and 2, the valve seats 18 and valve openings 19 of the check valves 17 are aligned with the longitudinal axis L along which the flow passage 14 extends through the inlet pipe 15, the valve bodies 11, and the outlet pipe 16. Accordingly, the valve member 20 is approximately centered on the flow passage 14 and the downstream flow of liquid through the flow passage 14 when in the closed position. As a consequence, the flow of liquid downstream through the flow passage 14 can experience noticeable pressure loss as the flow of liquid passes through the valve openings 19 of the check valves 17, pushes the valve members 20 to the respective open positions, and redirects around the valve members 20.

SUMMARY OF THE INVENTION

According to a first instance of the present disclosure, a backflow prevention device is provided. The backflow prevention device comprises a main pipe body extending from an inlet side to an outlet side, the main pipe body comprising a hollow interior defining a fluid passage extending along a first center longitudinal axis from the inlet side to the outlet side; at least one check valve disposed within the hollow interior of the main pipe body, the at least one check valve comprising a valve seat fixed within the hollow interior of the main pipe body and a valve member movably disposed on the valve seat between an open position and a closed position, the valve seat defining a valve opening extending therethrough, wherein the valve member is configured to move to the open position to permit a flow of liquid through the valve opening from the inlet side of the main pipe body to the outlet side and to move to the closed position to prevent a flow of liquid through the valve opening from the outlet side of the main pipe body to the inlet side; an inlet pipe connected to the inlet side of the main pipe body, the inlet pipe defining an inlet flow passage in communication with the fluid passage of the main pipe body; and an outlet pipe connected to the outlet side of the main pipe body, the outlet pipe defining an outlet flow passage in communication with the fluid passage of the main pipe body. The inlet flow passage and the outlet flow passage extend along a second center longitudinal axis. The first center longitudinal axis of the fluid passage of the main pipe body is offset with respect to the second center longitudinal axis of the inlet flow passage and the outlet flow passage in a direction perpendicular to the first center longitudinal axis and the second center longitudinal axis. A center of the valve seat of the at least one check valve is offset with respect to the second center longitudinal axis in the direction perpendicular to the first center longitudinal axis and the second center longitudinal axis.

According to a second instance of the present disclosure usable in combination with the first instance, the fluid passage of the main pipe body has an enlarged diameter in comparison to the inlet flow passage and the outlet flow passage.

According to a third instance of the present disclosure usable in combination with the first or second instances, the main pipe body has two check valves spaced apart along the first center longitudinal axis of the main pipe body.

According to a fourth instance of the present disclosure usable in combination with any one of the first through third instances, the center of the valve seat of the at least one valve check valve is aligned with the first center longitudinal axis.

According to a fifth instance of the present disclosure usable in combination with any one of the first through fourth instances, the valve member of the at least one check valve comprises a clapper member hingedly connected to the valve seat.

According to a sixth instance of the present disclosure usable in combination with the fifth instance, the clapper member is hingedly connected to the valve seat at a hinge point defined on the valve seat with respect to the center of the valve opening in the direction perpendicular to the first center longitudinal axis and the second center longitudinal axis.

According to a seventh instance of the present disclosure usable in combination with any one of the first through sixth instances, the main pipe body has a circular shape.

According to an eighth instance of the present disclosure usable in combination with any one of the first through fourth and seventh instances, the valve member of the at least one check valve comprises a poppet member slidably connected to the valve seat.

According to a ninth instance of the present disclosure usable in combination with the eighth instance, the poppet member is slidable on a pin member aligned with the center of the valve seat.

According to a tenth instance of the present disclosure usable in combination with the eighth or ninth instances, the center of the valve opening is aligned with the first center longitudinal axis.

According to an eleventh instance of the present disclosure usable in combination with any one of the first through tenth instances, each of the inlet pipe and the outlet pipe comprises a reducing fitting disposed adjacent to the inlet side of the main pipe body and the outlet side of the main pipe body, respectively.

According to a twelfth instance of the present disclosure, a backflow prevention system is provided. The backflow prevention system comprises a backflow prevention device. The backflow prevention device comprises a main pipe body extending from an inlet side to an outlet side, the main pipe body comprising a hollow interior defining a fluid passage extending along a first center longitudinal axis from the inlet side to the outlet side; at least one check valve disposed within the hollow interior of the main pipe body, the at least one check valve comprising a valve seat fixed within the hollow interior of the main pipe body and a valve member movably disposed on the valve seat between an open position and a closed position, the valve seat defining a valve opening extending therethrough, wherein the valve member is configured to move to the open position to permit a flow of liquid through the valve opening from the inlet side of the main pipe body to the outlet side and to move to the closed position to prevent a flow of liquid through the valve opening from the outlet side of the main pipe body to the inlet side; an inlet pipe connected to the inlet side of the main pipe body, the inlet pipe defining an inlet flow passage in communication with the fluid passage of the main pipe body; and an outlet pipe connected to the outlet side of the main pipe body, the outlet pipe defining an outlet flow passage in communication with the fluid passage of the main pipe body. The inlet flow passage and the outlet flow passage extend along a second center longitudinal axis. The first center longitudinal axis of the fluid passage of the main pipe body is offset with respect to the second center longitudinal axis of the inlet flow passage and the outlet flow passage in a direction perpendicular to the first center longitudinal axis and the second center longitudinal axis. A center of the valve seat is offset with respect to the second center longitudinal axis in the direction perpendicular to the first center longitudinal axis and the second center longitudinal axis. The backflow prevention system further comprises an upstream pipeline in communication with the inlet pipe of the backflow prevention device; a first shutoff valve disposed between the upstream pipeline and the inlet pipe; a downstream pipeline in communication with the outlet pipe of the backflow prevention device; and a second shutoff valve disposed between the outlet pipe and the downstream pipeline.

According to a thirteenth instance of the present disclosure usable in combination with the twelfth instance, the fluid passage of the main pipe body has an enlarged diameter in comparison to the inlet flow passage and the outlet flow passage.

According to a fourteenth instance of the present disclosure usable in combination with the twelfth or thirteenth instances, the main pipe body has two check valves spaced apart along the first center longitudinal axis thereof.

According to a fifteenth instance of the present disclosure usable in combination with any one of the twelfth through fourteenth instances, the center of the valve seat of the at least one valve member is aligned with the first center longitudinal axis.

According to a sixteenth instance of the present disclosure usable in combination with any one of the twelfth through fifteenth instances, the valve member of the at least one check valve comprises a clapper member hingedly connected to the valve seat.

According to a seventeenth instance of the present disclosure usable in combination with the sixteenth instance, the clapper member is hingedly connected to the valve seat at a hinge point defined on the valve seat with respect to the center of the valve opening in the direction perpendicular to the first center longitudinal axis and the second center longitudinal axis.

According to an eighteenth instance of the present disclosure usable in combination with any one of the twelfth through seventeenth instances, the main pipe body has a circular shape.

According to a nineteenth instance of the present disclosure usable in combination with any one of the twelfth through fifteenth instances, the valve member of the at least one check valve comprises a poppet member slidably connected to the valve seat.

According to a twentieth instance of the present disclosure usable in combination with the nineteenth instance, the poppet member is slidable on a pin member aligned with the center of the valve seat.

According to a twenty-first instance of the present disclosure usable in combination with the nineteenth or twentieth instances, the center of the valve opening is aligned with the first center longitudinal axis.

According to a twenty-second instance of the present disclosure usable in combination with any one of the twelfth through twenty-first instances, each of the inlet pipe and the outlet pipe comprises a reducing fitting disposed adjacent to the inlet side of the main pipe body and the outlet side of the main pipe body, respectively.

According to a twenty-third instance of the present disclosure usable in combination with any one of the twelfth through twenty-second instances, the upstream pipeline and the downstream pipeline extend along the second center longitudinal axis.

According to a twenty-fourth instance of the present disclosure, a backflow prevention system is provided. The backflow prevention system comprises a backflow prevention device according to any one of the first through eleventh instances; an upstream pipeline in communication with the inlet pipe of the backflow prevention device; a first shutoff valve disposed between the upstream pipeline and the inlet pipe; a downstream pipeline in communication with the outlet pipe of the backflow prevention device; and a second shutoff valve disposed between the outlet pipe and the downstream pipeline.

According to a twenty-fifth instance of the present disclosure usable in combination with the twenty-fourth instance, the upstream pipeline and the downstream pipeline extend along the second center longitudinal axis.

These and other features and characteristics of the present invention, as well as the methods of operation and functions of the related elements of structures and the combination of parts and economies of manufacture, will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular forms of "a", "an", and "the" include plural referents unless the context clearly dictates otherwise.

DETAILED DESCRIPTION OF THE INVENTION

Figure 1:
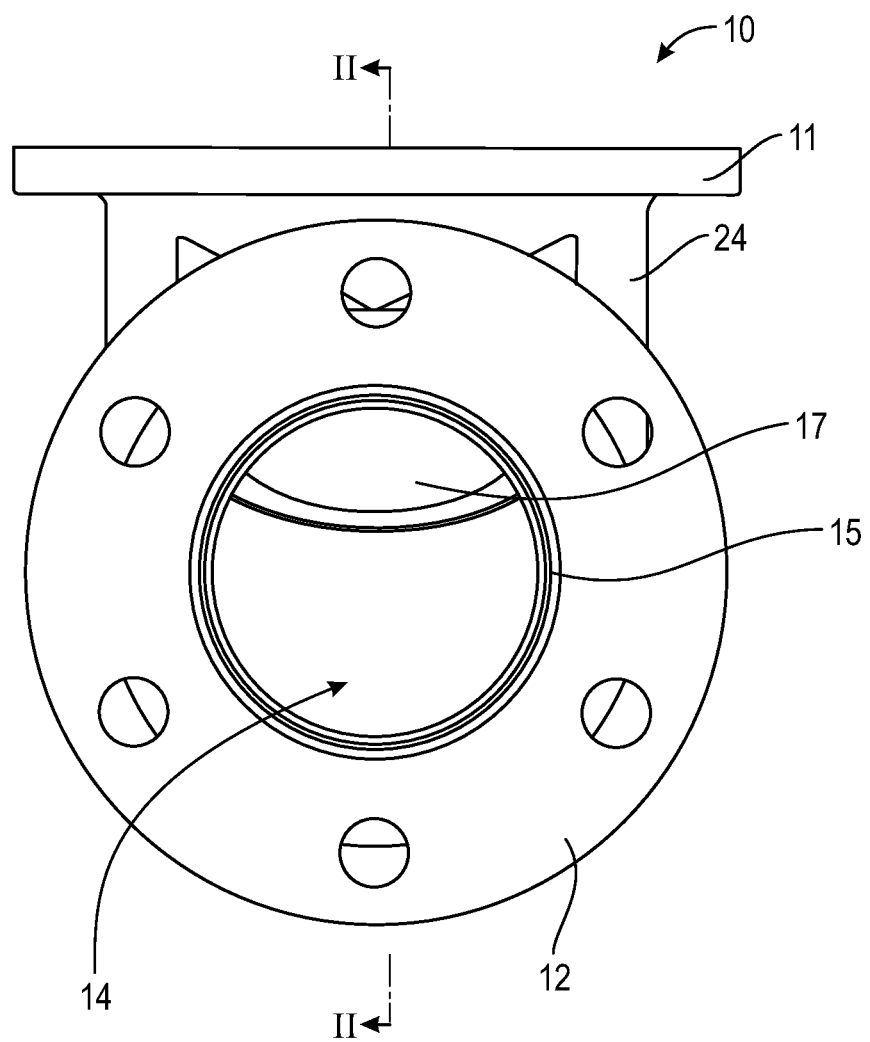
FIG. 1 is an end view of a backflow preventer according to a prior art example.
Figure 2:
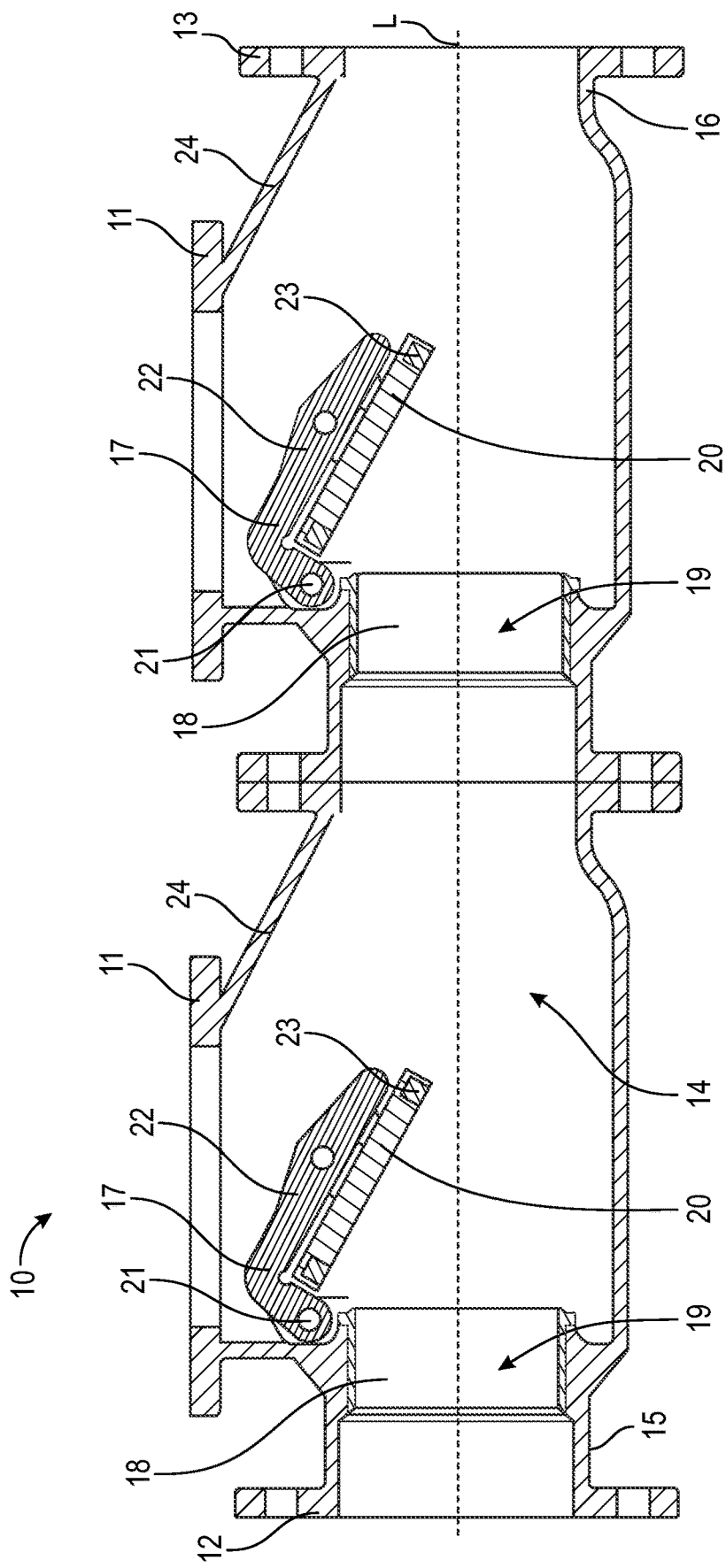
FIG. 2 is a cross-sectional view of the backflow preventer of FIG. 1 taken along lines II-II shown in FIG. 1.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings and described in the following specification are simply exemplary embodiments or aspects of the invention. Hence, specific dimensions and other physical characteristics related to the embodiments or aspects disclosed herein are not to be considered as limiting.

Figure 3:
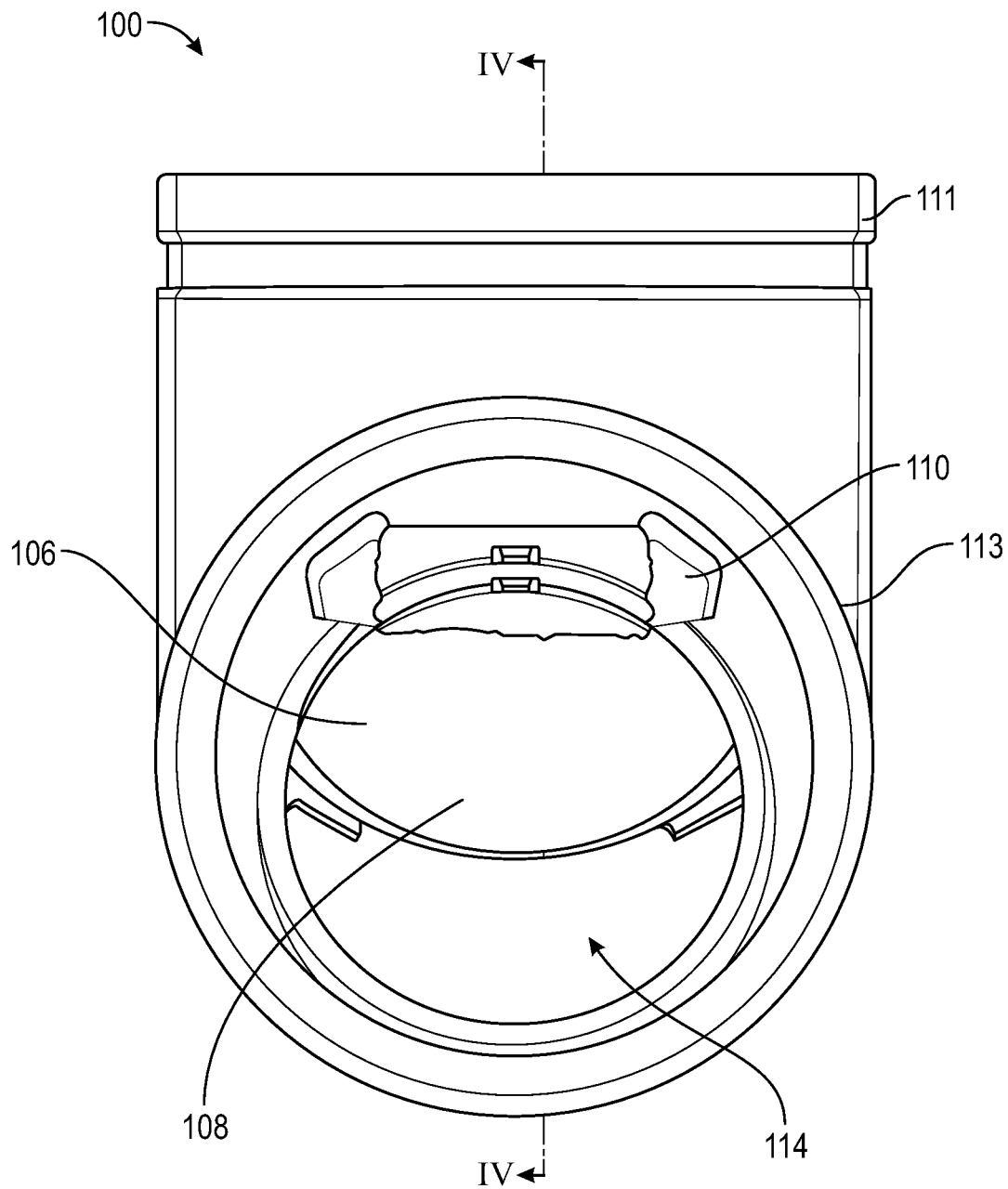
FIG. 3 is an end view of a backflow prevention device according to an example of the present disclosure.
Figure 4A:
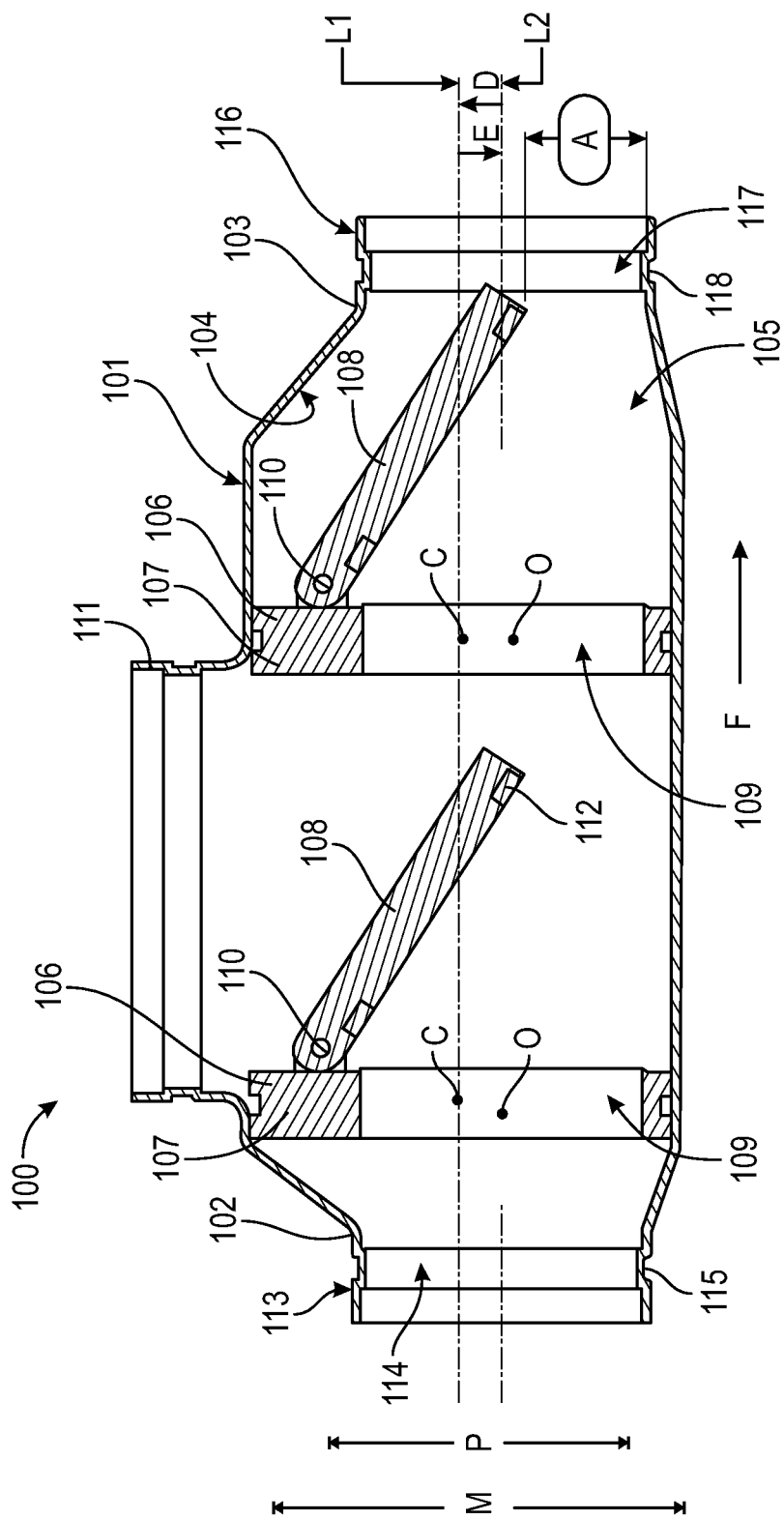
FIG. 4A is a cross-sectional view of the backflow prevention device of FIG. 3 taken along lines IV-IV shown in FIG. 3.

With reference to FIGS. 3 and 4A, a backflow prevention device 100 is shown in accordance with an example of the present disclosure. The backflow prevention device 100 includes a main pipe body 101 that extends from an inlet side 102 to an outlet side 103. The main pipe body 101 has a hollow interior 104 that defines a fluid passage 105 extending along a first center longitudinal axis L1 from the inlet side 102 to the outlet side 103. At least one check valve 106 is disposed within the hollow interior 104 of the main pipe body 101. The at least one check valve 106 includes a valve seat 107 fixed within the hollow interior 104 of the main pipe body 101 and a valve member 108 movably disposed on the valve seat 107 between an open position (shown in FIG. 4A) and a closed position. The valve seat 107 defines a valve opening 109 extending through the valve seat 107.

As shown in FIG. 4A, according to an example, the backflow prevention device 100 includes two check valves 106 spaced apart along the first center longitudinal axis L1 of the main pipe body 101. The valve member 108 of each check valve 106 includes a clapper member hingedly connected to the valve seat 107 at a hinge point defined by a hinge 110 on the valve seat 107. The valve member 108 is configured to move in a hinged motion about the hinge point to the open position shown in FIG. 4A to permit a flow of liquid through the valve opening 109 from the inlet side 102 of the main pipe body 101 to the outlet side 103 and to move to the closed position engaging the valve seat 107 to prevent a flow of liquid through the valve opening 109 from the outlet side 103 of the main pipe body 101 to the inlet side 102. The valve member 108 may include a gasket 112 or sealing member for forming a sealed engagement with the valve seat 107 surrounding the valve opening 109.

An inlet pipe 113 is connected to the inlet side 102 of the main pipe body 101. The inlet pipe 113 defines an inlet flow passage 114 in communication with the fluid passage 105 of the main pipe body 101 such that the flow of liquid through the inlet flow passage 114 passes into the fluid passage 105 to the at least one check valve 106. The inlet pipe 113 may include an inlet reducing fitting 115 disposed adjacent to the inlet side 102 of the main pipe body 101 for providing a connection between the inlet pipe 113 and the main pipe body 101. An outlet pipe 116 is connected to the outlet side 103 of the main pipe body 101. The outlet pipe 116 defines an outlet flow passage 117 in communication with the fluid passage 105 of the main pipe body 101 such that the flow of liquid through fluid passage 105 of the main pipe body 101 passes into outlet flow passage 117. The outlet pipe 116 may include an outlet reducing fitting 118 for providing a connection between the outlet pipe 116 and the main pipe body 101. According to an example, the fluid passage 105 of the main pipe body 101 has an enlarged diameter M in comparison to the diameter P of the inlet flow passage 114 and the outlet flow passage 117.

As shown in FIG. 4A, the inlet flow passage 114 and the outlet flow passage 117 extend along a second center longitudinal axis L2. The first center longitudinal axis L1 of the fluid passage 105 of the main pipe body 101 is offset with respect to the second center longitudinal axis L2 of the inlet flow passage 114 and the outlet flow passage 117 in a direction D that is perpendicular to the first center longitudinal axis L1 and the second center longitudinal axis L2. A center C of the valve seat 107 of the at least one check valve 106 is offset with respect to the second center longitudinal axis L2 in the direction D perpendicular to the first center longitudinal axis L1 and the second center longitudinal axis L2. According to an example, the center C of the valve seat 107 is aligned with the first center longitudinal axis L1, as shown in FIG. 4A.

According to the example of FIG. 4A, the valve opening 109 of the valve seat 107 of the at least one check valve 106 has a center O that is offset with respect to the first center longitudinal axis L1 in an opposing direction E perpendicular to the first center longitudinal axis L1 and the second center longitudinal axis L2. According to an example, the center O of the valve opening 109 may be aligned with the second center longitudinal axis L2. According to another example, the center O of the valve opening 109 may be offset with respect to both the first center longitudinal axis L1 and the second center longitudinal axis L2 in the opposing direction E perpendicular to the first center longitudinal axis L1 and the second center longitudinal axis L2. The clapper member is hingedly connected to the valve seat 107 at the hinge point, which is defined on the valve seat 107 with respect to the center O of the valve opening 109 in the direction D perpendicular to the first center longitudinal axis L1 and the second center longitudinal axis L2. It is to be appreciated that the valve opening 109 may have any suitable shape configuration. According to an example, the valve opening may have a circular shape, an ovular or elliptical shape, an oblong circular shape, a rectangular or substantially rectangular shape, or a polygonal, i.e., hexagonal or octagonal, or substantially polygonal shape.

According to the example of FIGS. 3 and 4A, fluid passes through the backflow prevention device 100 from the inlet flow passage 114 to the outlet flow passage 117 in a flow direction F along the second center longitudinal axis L2 of the inlet flow passage 114 and the outlet flow passage 117. The expansion of the main pipe body 101 of the backflow prevention device 100 in combination with the offset between the first center longitudinal axis L1 of the main pipe body 101 and the second center longitudinal axis L2 in the perpendicular direction D allows for the center C of the valve seat 107 to be offset from the second longitudinal axis L2 and for the hinge point of the clapper member to be positioned further away from the second center longitudinal axis L2 in the perpendicular direction D than if the valve seat 107 were to be centered on the axis of the flow direction F. The flow of fluid in the flow direction F applies an increased torque to the clapper member about the hinge point to maintain the clapper member in the opened position, and the clapper member is positioned out of the center of the flow along the second center longitudinal direction L2, which provides for an increased space A, shown in FIG. 4A, for fluid to flow through the main pipe body 101 from the inlet side 102 to the outlet side 103.

As a result, the pressure loss of the fluid flowing through the check valves 106 in the main pipe body 101 is reduced, and the flow of fluid through the backflow prevention device 100 in the flow direction F is more efficient due to the reduction/minimization of the redirection of flow as the fluid passes through the valve openings 109 of the check valves 106. The flow of fluid through the check valves 106 is also smoother and less turbulent. Debris is also less likely to become caught in the hinge 110 of the clapper member, since the hinge 110 and any mechanism that may be used to bias the clapper member to the closed position is positioned further away from the flow along the second center longitudinal axis L2. According to an example, the hinge 110 may also incorporate an additional mechanism for limiting the movement of the clapper member to the open position.

According to the example, the outside edges of the valve openings 109 are positioned away from the first center longitudinal axis L1 such that the valve openings 109 are more aligned with the inlet flow passage 114 and the outlet flow passage 117 than with the fluid passage 105 of the main pipe body 111. The valve seats 107 do not provide additional resistance to the flow of fluid through the main pipe body 101. Due to the increased size of the main pipe body 101, the valve openings 109 may be further enlarged to improve flow and reduce pressure loss.

Figure 4B:
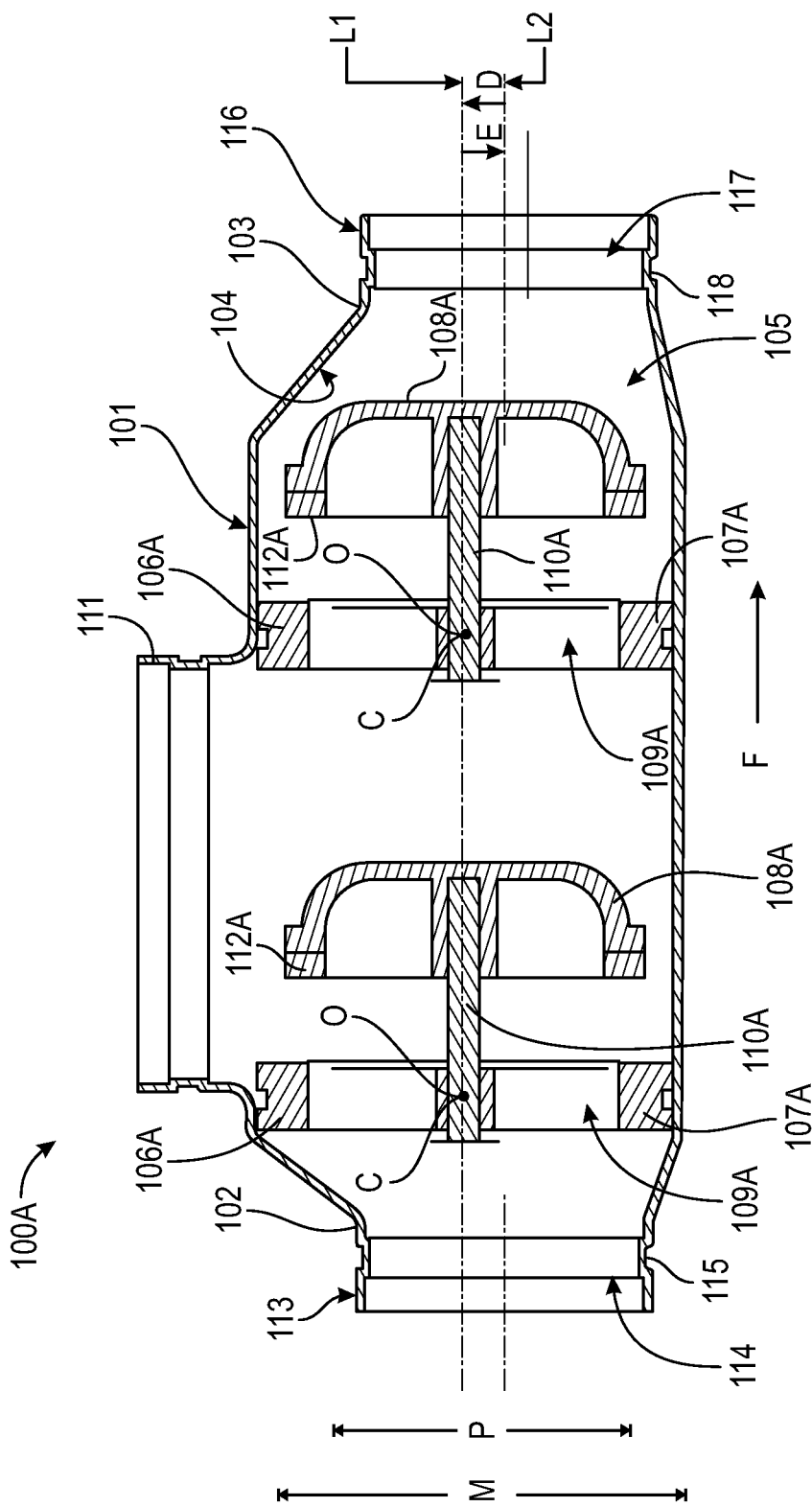
FIG. 4B is a cross-sectional view of a backflow prevention device according to another example of the present disclosure.

With reference to FIG. 4B, a backflow prevention device 100A is shown in accordance with another example of the present disclosure. The backflow prevention device 100A shown in FIG. 4B is the same as the backflow prevention device 100 discussed above with respect to FIG. 4A, except that the backflow prevention device 100A shown in FIG. 4B utilizes a linear poppet valve member 108A, which is configured to move in a reciprocating, sliding motion, instead of a hinged clapper valve member 108.

According to the example shown in FIG. 4B, the backflow prevention device 100A includes at least one check valve 106A disposed within the main pipe body 101. In particular, the backflow prevention device 100A includes two check valves 106A disposed within the main pipe body 101 and spaced apart along the first center longitudinal axis L1 of the main pipe body 101. The valve member 108A of each check valve 106A includes a poppet member slidably connected to the valve seat 107A. The poppet member is slidable on a pin member 110A aligned with the center C of the valve seat 107A. The valve member 108A is configured to move in a sliding motion along the pin member 110A to the open position shown in FIG. 4A to permit a flow of liquid through the valve opening 109A from the inlet side 102 of the main pipe body 101 to the outlet side 103 and to the closed position engaging the valve seat 107A to prevent a flow of liquid through the valve opening 109A from the outlet side 103 of the main pipe body 101 to the inlet side 102. The valve member 108A may include a gasket 112A or sealing member for forming a sealed engagement with the valve seat 107A surrounding the valve opening 109A.

As shown in FIG. 4B, the inlet flow passage 114 and the outlet flow passage 117 extend along the second center longitudinal axis L2. The first center longitudinal axis L1 of the fluid passage 105 of the main pipe body 101 is offset with respect to the second center longitudinal axis L2 of the inlet flow passage 114 and the outlet flow passage 117 in the direction D that is perpendicular to the first center longitudinal axis L1 and the second center longitudinal axis L2. A center C of the valve seat 107A of the at least one check valve 106A is offset with respect to the second center longitudinal axis L2 in the direction D perpendicular to the first center longitudinal axis L1 and the second center longitudinal axis L2. According to an example, the center C of the valve seat 107A is aligned with the first center longitudinal axis L1, as shown in FIG. 4B. According to another example, the center O of the valve opening 109A of the valve seat 107A is also aligned with the first center longitudinal axis L1, as shown in FIG. 4B.

Figure 5:
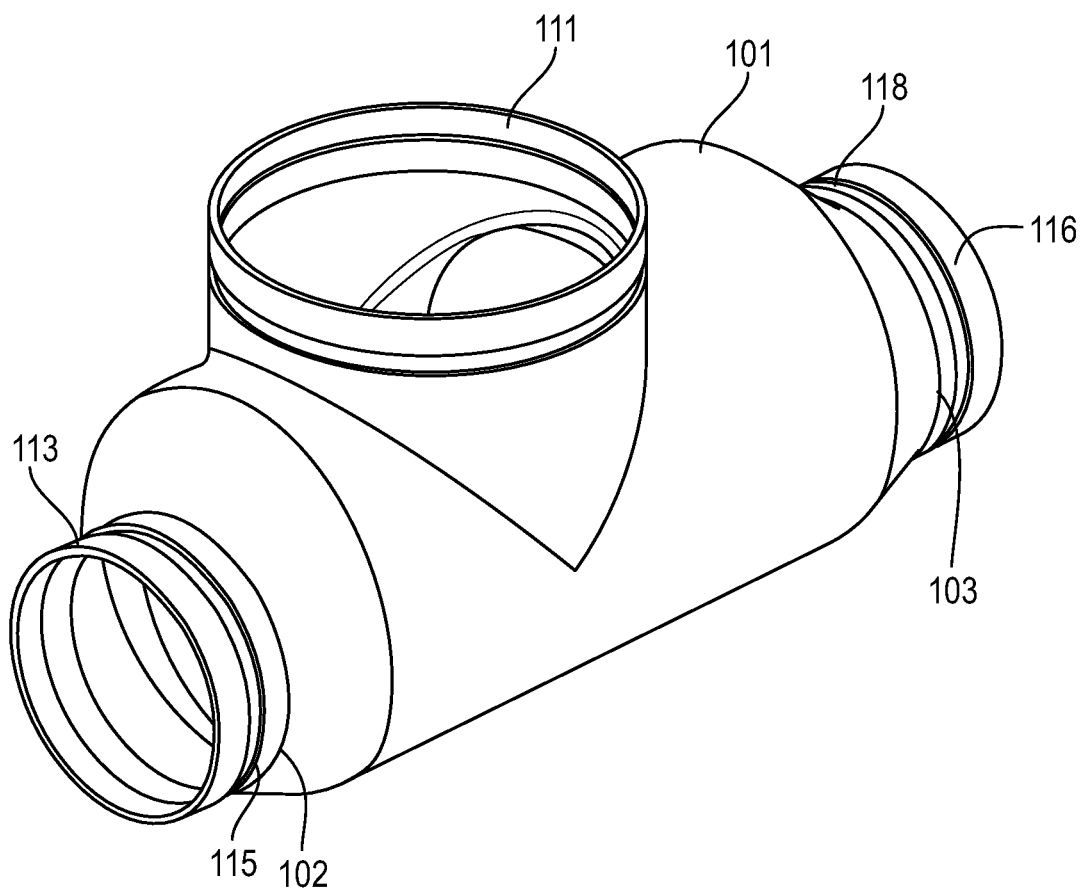
FIG. 5 is a perspective view of a main pipe body of of the backflow prevention device of FIG. 3.

FIG. 5 shows the main pipe body 101 that may be used in connection with the backflow prevention device 100 described above with reference to FIGS. 3 and 4A and in connection with the backflow prevention device 100A described above with reference to FIG. 4B. The main pipe body 101 has a circular shape with a top extension 111 extending upwardly from the circular main pipe body 101, i.e., in the direction D shown in FIGS. 4A and 4B. The top extension 111 defines an access opening that allows for access to both of the valve members 108, 108A, as well as any associated components, positioned within the hollow interior 104. According to an example, the main pipe body 101 comprises a circular pipe that is mechanically expanded, such as through hydroforming, to form an enlarged body capable of accommodating the valve members 108, 108A in a single main pipe body 101 without requiring the formation or assembly of a raised portion on to the main pipe body 101. The inlet pipe 113 and the outlet pipe 114 are joined to the main pipe body 101 by the reducing fittings and are positioned eccentric to the first center longitudinal axis L1, which is the center axis of the main pipe body 101, in the direction E shown in FIGS. 4A and 4B, as discussed above. Accordingly, the main pipe body 101, the inlet pipe 113, and the outlet pipe 114 may be manufactured from stock pipe materials that are suitably formed or expanded and then assembled. This process can lead to significant time and cost savings in comparison to the traditional manufacture of valve bodies via casting techniques. It is to be appreciated that the backflow prevention device 100, 100A described above with reference to FIGS. 3-4B may be constructed from any suitable materials and according to any suitable techniques.

According to another example, the backflow prevention device includes check valves of different configurations. For instance, the backflow prevention device may include a check valve 106 with a hinged clapper member, as described above with reference to FIG. 4A, and a check valve 106A with a linearly slidable poppet member, as described above with reference to FIG. 4B. According to another example, the backflow prevention device includes check valves that undergo a combination of pivoting and linear movements between the open and closed positions.

Figure 6:
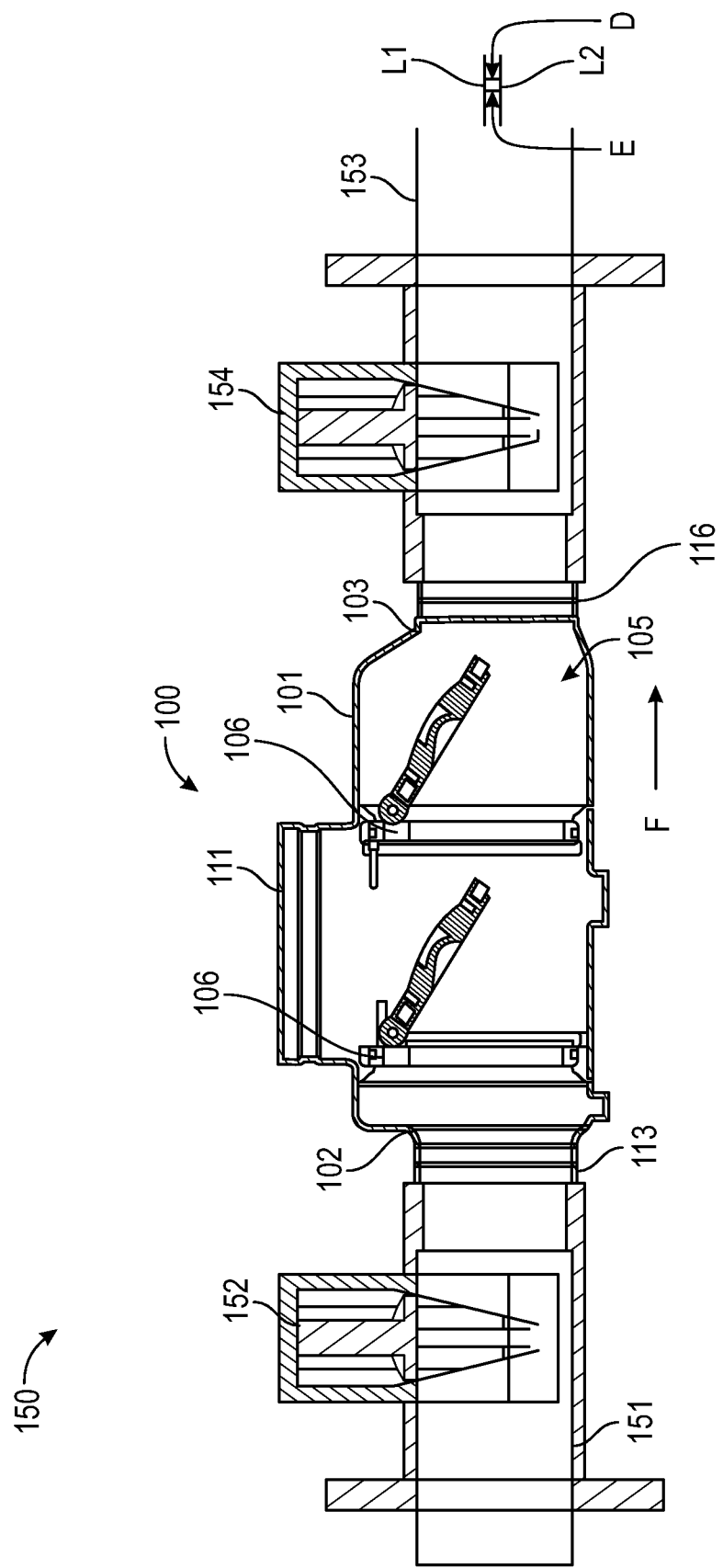
FIG. 6 is a cross-sectional view of a backflow prevention system according to an example of the present disclosure.

With reference to FIG. 6, a backflow prevention system 150 is shown in accordance with an example of the present disclosure. The backflow prevention system 150 includes the backflow prevention device 100 discussed above with reference to FIGS. 3-4A. It is to be appreciated that the backflow prevention system 150 may alternatively include the backflow prevention device 100A discussed above with reference to FIG. 4B. The backflow prevention system 150 also includes an upstream pipeline 151 in communication with the inlet pipe 113 of the backflow prevention device 100, 100A, a first shutoff valve 152 disposed between the upstream pipeline 151 and the inlet pipe 113, a downstream pipeline 153 in communication with the outlet pipe 116 of the backflow prevention device 100, 100A, and a second shutoff valve 154 disposed between the outlet pipe 116 and the downstream pipeline 153. According to an example, the upstream pipeline 151 and the downstream pipeline 153 extend along the second center longitudinal axis L2 of the inlet flow passage 114 and the outlet flow passage 117 of the backflow prevention device 100, 100A such that the flow of fluid through the backflow prevention device 100 is not re-directed by the upstream pipeline 151 or the downstream pipeline 153. As shown in FIG. 6, the openings of the first and second shutoff valves 152, 154 are also aligned with the second center longitudinal axis L2. It is to be appreciated that the backflow prevention system 150 incorporating the backflow prevention device 100, 100A discussed above with reference to FIGS. 3-4B may be provided in any suitable configuration.

It is to be understood that the invention may assume various alternative variations and step sequences, except where expressly specified to the contrary. It is also to be understood that the specific devices and processes illustrated in the attached drawings and described in the specification are simply exemplary embodiments or aspects of the invention. Although the invention has been described in detail for the purpose of illustration based on what is currently considered to be the most practical and preferred embodiments or aspects, it is to be understood that such detail is solely for that purpose and that the invention is not limited to the disclosed embodiments or aspects but, on the contrary, is intended to cover modifications and equivalent arrangements that are within the spirit and scope thereof. For example, it is to be understood that the present invention contemplates that, to the extent possible, one or more features of any embodiment or aspect can be combined with one or more features of any other embodiment or aspect.

The invention claimed is:

1. A backflow prevention device comprising:
   a main pipe body extending from an inlet side to an outlet side, the main pipe body comprising a hollow interior defining a fluid passage extending along a first center longitudinal axis from the inlet side to the outlet side;
   at least one check valve disposed within the hollow interior of the main pipe body, the at least one check valve comprising a valve seat fixed within the hollow interior of the main pipe body and a valve member movably disposed on the valve seat between an open position and a closed position, the valve seat defining a valve opening extending therethrough,
   wherein the valve member is configured to move to the open position to permit a flow of liquid through the valve opening from the inlet side of the main pipe body to the outlet side and to move to the closed position to prevent a flow of liquid through the valve opening from the outlet side of the main pipe body to the inlet side;
   an inlet pipe connected to the inlet side of the main pipe body, the inlet pipe defining an inlet flow passage in communication with the fluid passage of the main pipe body; and
   an outlet pipe connected to the outlet side of the main pipe body, the outlet pipe defining an outlet flow passage in communication with the fluid passage of the main pipe body,
   wherein the inlet flow passage and the outlet flow passage extend along a second center longitudinal axis, wherein the first center longitudinal axis of the fluid passage of the main pipe body is offset with respect to the second center longitudinal axis of the inlet flow passage and the outlet flow passage in a direction perpendicular to the first center longitudinal axis and the second center longitudinal axis, wherein a center of the valve seat of the at least one check valve is offset with respect to the second center longitudinal axis in the direction perpendicular to the first center longitudinal axis and the second center longitudinal axis, and wherein the center of the valve seat of the at least one check valve is aligned with the first center longitudinal axis.

2. The backflow prevention device according to claim 1, wherein the fluid passage of the main pipe body has an enlarged diameter in comparison to the inlet flow passage and the outlet flow passage.

3. The backflow prevention device according to claim 1, wherein the main pipe body comprises two check valves spaced apart along the first center longitudinal axis thereof.

4. The backflow prevention device according to claim 1, wherein the valve member of the at least one check valve comprises a clapper member hingedly connected to the valve seat.

5. The backflow prevention device according to claim 4, wherein the clapper member is hingedly connected to the valve seat at a hinge point defined on the valve seat with respect to the center of the valve opening in the direction perpendicular to the first center longitudinal axis and the second center longitudinal axis.

6. The backflow prevention device according to claim 1, wherein the main pipe body has a circular shape.

7. The backflow prevention device according to claim 1, wherein the valve member of the at least one check valve comprises a poppet member slidably connected to the valve seat.

8. The backflow prevention device according to claim 7, wherein the poppet member is slidable on a pin member aligned with the center of the valve seat.

9. The backflow prevention device according to claim 7, wherein the center of the valve opening is aligned with the first center longitudinal axis.

10. The backflow prevention device according to claim 1, wherein each of the inlet pipe and the outlet pipe comprises a reducing fitting disposed adjacent to the inlet side of the main pipe body and the outlet side of the main pipe body, respectively.

11. The backflow prevention device of claim 1, wherein, when the valve member is in the open position, the valve member and the main pipe body define a space therebetween, and wherein when an offset between the first center longitudinal axis and the second center longitudinal axis increases, the space between the valve member and the main pipe body increases.

12. A backflow prevention system, comprising:
a backflow prevention device, the backflow prevention device comprising:
a main pipe body extending from an inlet side to an outlet side, the main pipe body comprising a hollow interior defining a fluid passage extending along a first center longitudinal axis from the inlet side to the outlet side;
at least one check valve disposed within the hollow interior of the main pipe body, the at least one check valve comprising a valve seat fixed within the hollow interior of the main pipe body and a valve member movably disposed on the valve seat between an open position and a closed position, the valve seat defining a valve opening extending therethrough, wherein the valve member is configured to move to the open position to permit a flow of liquid through the valve opening from the inlet side of the main pipe body to the outlet side and to move to the closed position to prevent a flow of liquid through the valve opening from the outlet side of the main pipe body to the inlet side;

an inlet pipe connected to the inlet side of the main pipe body, the inlet pipe defining an inlet flow passage in communication with the fluid passage of the main pipe body; and an outlet pipe connected to the outlet side of the main pipe body, the outlet pipe defining an outlet flow passage in communication with the fluid passage of the main pipe body, wherein the inlet flow passage and the outlet flow passage extend along a second center longitudinal axis, wherein the first center longitudinal axis of the fluid passage of the main pipe body is offset with respect to the second center longitudinal axis of the inlet flow passage and the outlet flow passage in a direction perpendicular to the first center longitudinal axis and the second center longitudinal axis, wherein a center of the valve seat is offset with respect to the second center longitudinal axis in the direction perpendicular to the first center longitudinal axis and the second center longitudinal axis, and wherein the center of the valve seat of the at least one check valve is aligned with the first center longitudinal axis;

an upstream pipeline in communication with the inlet pipe of the backflow prevention device;
a first shutoff valve disposed between the upstream pipeline and the inlet pipe;
a downstream pipeline in communication with the outlet pipe of the backflow prevention device; and
a second shutoff valve disposed between the outlet pipe and the downstream pipeline.

13. The backflow prevention system according to claim 12, wherein the fluid passage of the main pipe body has an enlarged diameter in comparison to the inlet flow passage and the outlet flow passage.

14. The backflow prevention system according to claim 12, wherein the main pipe body comprises two check valves spaced apart along the first center longitudinal axis thereof.

15. The backflow prevention system according to claim 12, wherein the valve member of the at least one check valve comprises a clapper member hingedly connected to the valve seat.

16. The backflow prevention system according to claim 15, wherein the clapper member is hingedly connected to the valve seat at a hinge point defined on the valve seat with respect to the center of the valve opening in the direction perpendicular to the first center longitudinal axis and the second center longitudinal axis.

17. The backflow prevention system according to claim 12, wherein the main pipe body has a circular shape.

18. The backflow prevention system according to claim 12, wherein the valve member of the at least one check valve comprises a poppet member slidably connected to the valve seat.

19. The backflow prevention system according to claim 18, wherein the poppet member is slidable on a pin member aligned with the center of the valve seat.

20. The backflow prevention system according to claim 18, wherein the center of the valve opening is aligned with the first center longitudinal axis.

21. The backflow prevention system according to claim 12, wherein each of the inlet pipe and the outlet pipe comprises a reducing fitting disposed adjacent to the inlet side of the main pipe body and the outlet side of the main pipe body, respectively.

22. The backflow prevention system according to claim 12, wherein the upstream pipeline and the downstream pipeline extend along the second center longitudinal axis.

23. The backflow prevention system according to claim 12, wherein, when the valve member is in the open position, the valve member and the main pipe body define a space therebetween, and wherein when an offset between the first center longitudinal axis and the second center longitudinal axis increases, the space between the valve member and the main pipe body increases.

* * * * *